A. V. CLELAND.
GRAIN CLEANER.
APPLICATION FILED JAN. 8, 1918.

1,365,304.  Patented Jan. 11, 1921.

WITNESSES

INVENTOR
ANDREW V. CLELAND
BY
ATTORNEYS

UNITED STATES PATENT OFFICE.

ANDREW V. CLELAND, OF MINNEAPOLIS, MINNESOTA.

GRAIN-CLEANER.

1,365,304.  Specification of Letters Patent.  Patented Jan. 11, 1921.

Application filed January 8, 1918. Serial No. 210,919.

*To all whom it may concern:*

Be it known that I, ANDREW V. CLELAND, a citizen of the United States, resident of Minneapolis, county of Hennepin, State of Minnesota, have invented certain new and useful Improvements in Grain-Cleaners, of which the following is a specification.

The object of my invention is to provide a machine having a weight or gravity selection of the grain, in which the light and heavy grains are separated by an air blast, the light grains moving to the front of the stream while the heavy grains remain in the background.

A further object is to provide a more perfect separation of the grains by providing means to prevent the kernels from bounding from one screen to another and thereby effect a better separation of the shrunken from the perfect kernels than was heretofore thought possible with machines of this kind as usually constructed.

Other objects of the invention will appear from the following detailed description.

The invention consists generally in various constructions and combinations, all as hereinafter described and particularly pointed out in the claims.

In the accompanying drawings forming part of this specification,

Figures 2, 3, 4:
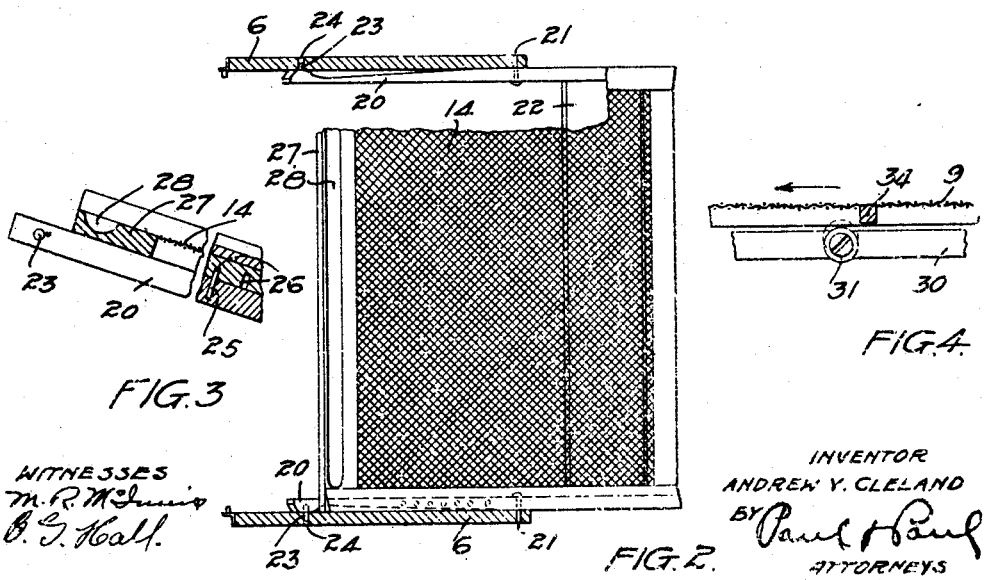
Fig. 2 is a plan section on the line 2—2 of Fig. 1, showing part of the screen broken away.
Fig. 3 is a detail sectional view of the screen.
Fig. 4 is a detail view taken on the line 4—4 of Fig. 1.

In the drawing, 2 represents the frame of the machine, having a hopper 3, feed roll 4 and blast fan 5. 6 is a shoe, hung within the frame and mounted to shake or oscillate, as usual in machines of this type. The shoe is provided at the top with a transverse plate 7 and at the bottom with cross bars 8. A sieve 9 is provided, beneath the hopper, and resting at its upper end upon the plate 7, while the lower end of the sieve has blocks 10 mounted thereon which are notched to engage a rod 11 that is vertically adjustable in a slot 12 at the front end of the shoe. By raising or lowering this rod or by adjusting the sieve lengthwise on the rod the inclination of the sieve 9 may be varied according to the character of the grain that is being cleaned and the desired speed of movement of the grain over the sieve. Beneath the sieve 9 I provide a grading board or plate 13 in position to receive grain that falls through the meshes of the sieve 9. The plate 13 is inclined, as shown, and the material discharged therefrom will drop upon a sieve 14 in the lower part of the shoe and during the descent of the grain from the plate 13 to the sieve it will be subjected to a blast of air from the fan which will operate to blow the lighter kernels of grain over the upper end of the screen 14 upon a sieve 15 mounted in the lower part of the shoe beneath the sieve 14 and arranged to lap by the upper end thereof. The very light kernels, with the chaff, will be blown over the upper end of the sieve 15, while the seeds and material working through the meshes of the sieve will drop upon the opposite plate 16 beneath and be directed thereby either forward or backward, as may be preferred. The full, plump kernels of grain flowing down over the sieve 15 will enter the spout 17 for delivery at the side of the machine. Any grain passing down over the sieve 14 will be delivered upon the adjustable board 18 at the rear of the machine and beneath the lower end of said sieve 14. From this plate the grain may be conducted to a suitable receptacle outside the machine. The sieve 14 is preferably supported upon spring bars 20 pivoted at 21 to the end walls of the shoe. These bars are held in parallel relation by a cross plate 22 at one end and the opposite ends of the bars are provided with pins 23 fitting within holes 24 in the walls of the shoe. As shown plainly in Fig. 2, the bars 20 have the pins 23 mounted therein and to disengage them from the sockets 24 the bars are pressed inwardly until the pins 23 are pulled out of the sockets and then the bars may be tilted on the pins 21 to change their adjustment.

Figure 1:
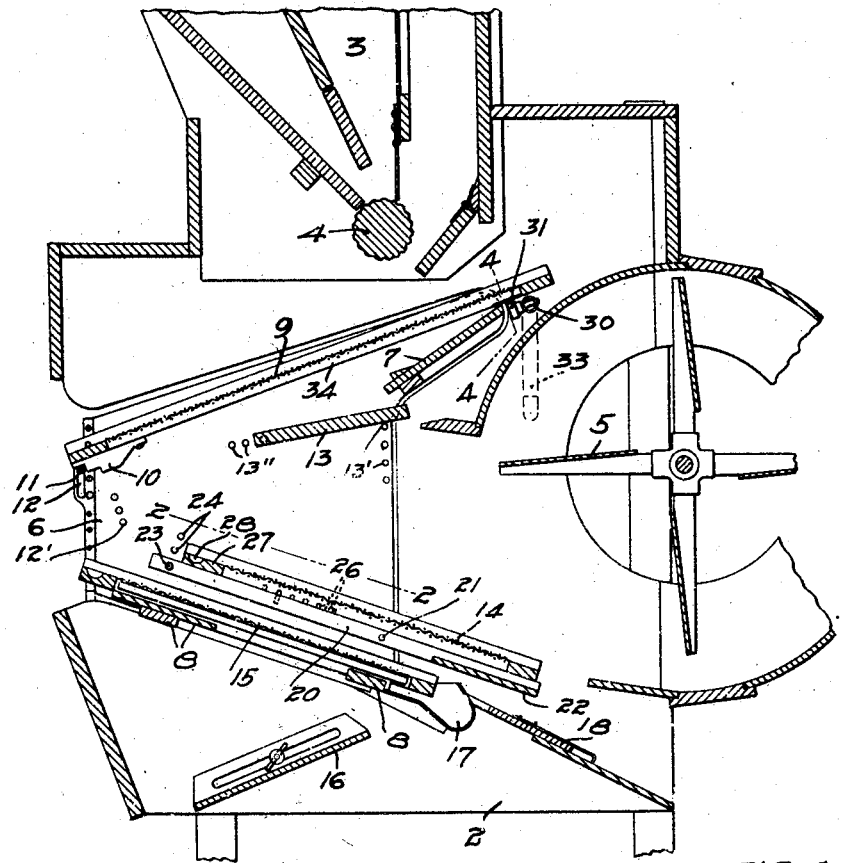
Figure 1 is a cross sectional view of the grain cleaner.

As shown in Fig. 1, I provide a series of the holes 24 arranged one above the other so that the sieve can be set for different angles or degrees of inclination, according to the character of the grain that is being cleaned. Pins 25 are mounted in the bars 20 to enter holes 26 in the frame of the sieve 14 and thereby allow longitudinal adjustment of the sieve on said bars for the purpose of obtaining the desired relation or position in the shoe with respect to the grading plate or board 13. The pins 25 and the holes 26 will be placed in the opposing upper faces of the bars and under faces of the screen frame, and when the sieve is in place it locks the bars 20 also. This locking of the bars is due, of course, to the fact that when the sieve is in place on the top of the bars and held by the pins and sockets, it will not be possible to press the bars 20 inwardly to disengage their pins from the sockets 24. I therefore have provided not only a very simple and cheap construction for holding the sieve in place, but I also utilize the sieve for locking the bars 20 against premature inward movement.

The plate 13 is also mounted for longitudinal adjustment on the pins 13′ and holes 13″ to obtain the desired inclination. Holes 12′ are also provided in the end walls of the shoe for the support of a gang of sieves when the sieve 9 is removed. I do not illustrate this gang, as it forms no part of my present invention.

The cross bar 27 at the upper end of the sieve 14 is provided with a longitudinal groove 28 that is substantially semi-circular in cross section. The object of this groove is to receive and retain kernels of grain therein and has the function of a pocket so that the grain accumulating in the groove and rising therein above the level of the cross bar forms an accumulation or bank of grain extending the full width of the sieve. The kernels falling upon this bank will remain temporarily instead of bounding, as they would almost surely do if they struck the hard surface of the cross bar. The blast of air operating on this bank of grain will impart in effect a rotary movement thereto, causing the heavier kernels as they work to the top of the bank to roll or slide down over the screen 14, while the lighter kernels are forced over the bank and the edge of the cross bar upon the screen 15 beneath. I prefer also to provide the sieve 15 with a groove 28 corresponding to the one in the sieve 14 and having substantially the same function, the grain accumulating therein and forming a bank with a rounded upper surface extending the full width of the sieve. By means of these grooves I may be able to effect a more perfect separation of the plump and light kernels and increase in a marked degree the efficiency and capacity of the machine.

In some instances it is desirable to provide means for jarring the sieve 9 to keep it clean. I therefore provide a rod 30 having supports in the frame 2 and upon said rod at suitable intervals I provide a series of rollers 31. The rod 30 has an operating lever 33 within convenient reach of the outside of the machine. I prefer to mount this lever so that there will be sufficient friction between it and the frame of the machine to hold it in any desired position. The sieve 9 is provided with cross bars 34 in the path of the rollers 31 and when the rollers are raised to engage the cross bars the sieve will ride thereon and be alternately lifted and dropped upon the plate 7 and a jarring movement will thereby be imparted to the sieve sufficient to keep its meshes clean.

I do not wish to be confined in this application to the number of sieves shown or the particular manner of adjusting them, as in various ways the details of construction herein shown and described may be modified and still be within the scope of my invention.

I claim as my invention:

1. The combination, with a shoe, of bars pivoted thereon, pins provided at one end of said bars to fit holes arranged one above the other in the side walls of said shoe for the vertical adjustment of said bars, and a sieve supported on said bars for adjustment therewith.

2. In a grain cleaning machine, the combination, with a shoe, of a grading plate mounted at an incline therein and over which the grain passes, a sieve supported beneath said grading plate, the head of said sieve having a comparatively narrow transverse groove therein to form a pocket for the accumulation of grain falling over said plate, the kernels of grain flowing from said groove upon the meshes of the sieve.

3. In a grain cleaning machine, the combination, with a shoe, of a sieve mounted in the upper part thereof, a grading plate mounted at an inclination beneath said sieve to receive the grain therefrom, sieves arranged beneath said grading plate and inclined oppositely to said first named sieve, the upper end of the lower sieve projecting beyond the corresponding end of the upper sieve to receive the material from said grading plate, and said sieves being mounted for relative adjustment for increasing or decreasing the amount of material delivered respectively to said sieves.

4. The combination, with a shoe, of bars mounted to tilt therein and having pins in their upper surfaces, a sieve having side rails adapted to rest on said bars and provided with sockets at intervals to receive the pins of said bars for longitudinal adjustment of said sieve on said bars.

5. In a grain cleaning machine, a shoe, a sieve mounted therein, a grading plate supported for adjustment beneath said sieve, a pair of sieves mounted in said shoe beneath said grading plate to receive the grain therefrom, one of said sieves being mounted to tilt to vary its inclination and adjustable lengthwise to change its position with respect to said grading plate and vary the volume of grain received therefrom.

6. The combination, with a shoe, of bars having horizontal pivots thereon and pins mounted in said bars for entering sockets arranged one above the other in the walls of said shoe, and a sieve mounted on said bars and interlocking therewith to prevent premature inward movement of said bars to disengage their pins from the sockets in said shoe.

7. The combination, with a sieve having a head provided with a trough running transversely of the sieve, and means for delivering the grain to said trough, the grain accumulating in said trough forming an accumulation or bank across the sieve, a fan mounted to direct air currents over said sieve and trough, the grain in said trough having a rotary movement therein, the heavier kernels working to the top and falling down over the screen while the lighter material is carried away by the air currents.

In witness whereof, I have hereunto set my hand this 18" day of December, 1917.

ANDREW V. CLELAND.